G. CLAUDE.
PROCESS FOR THE SYNTHETIC PRODUCTION OF AMMONIA.
APPLICATION FILED MAR. 14, 1918.
1,332,460.
Patented Mar. 2, 1920.
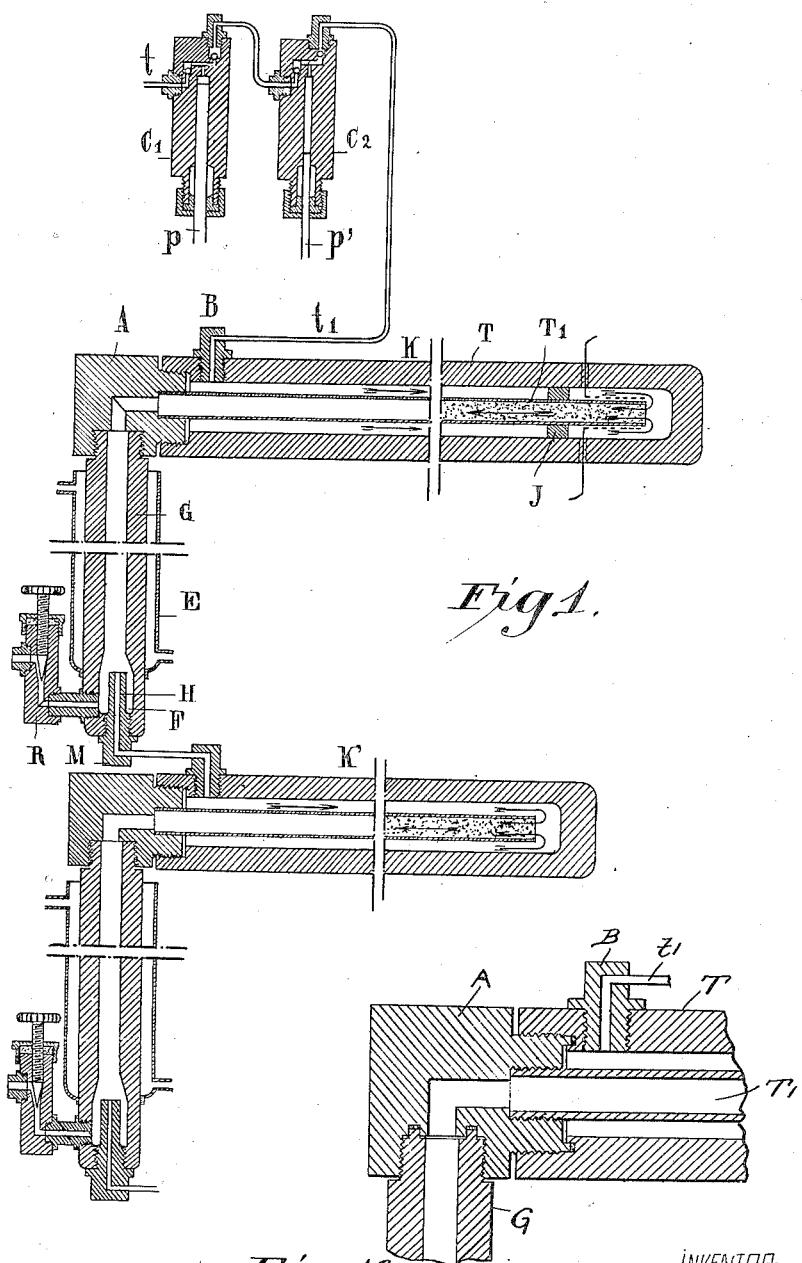

UNITED STATES PATENT OFFICE.

GEORGES CLAUDE, OF PARIS, FRANCE, ASSIGNOR TO L'AIR LIQUIDE (SOCIETE ANONYME POUR L'ETUDE ET L'EXPLOITATION DES PROCEDES GEORGES CLAUDE), OF PARIS, FRANCE.

PROCESS FOR THE SYNTHETIC PRODUCTION OF AMMONIA.

1,332,460.     Specification of Letters Patent.   Patented Mar. 2, 1920.

Application filed March 14, 1918. Serial No. 222,502.

*To all whom it may concern:*

Be it known that I, GEORGES CLAUDE, a citizen of the Republic of France, residing at and whose post-office address is 48 Rue St. Lazare, in the city of Paris, Republic of France, have invented certain new and useful Improvements in Processes for the Synthetic Production of Ammonia, of which the following is a specification.

As is well known, in the direct synthetic manufacture of ammonia from its elements, as heretofore carried out commercially, the gases are always brought up to a certain pressure. For this pressure, from 1 to 100 atmospheres were originally proposed, with an operating temperature higher than dark red heat, and with or without the presence of a catalyst. Later, Haber succeeded in establishing a commercial process by likewise working at a relatively high temperature and in the presence of catalysts but with the employment of higher pressures, *i. e.* from 100 to 200 atmospheres, which he regards as enormous.

Haber has stated, in his article on the subject, (which appeared in the year 1913, in the *Zeitschrift für Elektrochemie*) the pressures at which he operated. He also states that, theoretically, the content of ammonia obtainable in the gas mixture increases proportionately to the pressure only when the conditions of the reaction permit small proportions of ammonia to be produced, and that, for high concentrations, an increase in the pressure is of no additional advantage.

It is well known, furthermore, that, at pressure above 200 to 300 atmospheres, gases, notably nitrogen and hydrogen, taken either separately or in admixture, can be compressed less and less readily. This has been explained by the conception of co-volume, that is to say, the volume proper of supposedly incompressible matter and which limits the smallest volume to which we can reduce a gas. It follows that, at these pressures, the density of gases increases but slightly as the pressure increases and, consequently, the same is true of the action called mass-action which is one of the coefficients of equilibrium of the reaction.

Moreover, from the practical standpoint, it seems certainly extremely difficult to obtain pressures much higher than those above noted, to maintain the apparatus leak-proof when such pressures are employed, and to combine them with high temperatures.

The several considerations recited would, therefore, discourage any idea of exceeding pressures of from 150 to 200 atmospheres, which had been already employed in the art of gas compression. In fact, all of the work done in this field since Haber has tended to lower the operating pressure as much as possible.

I have ascertained, however, that contrary to the prevailing opinion above indicated, the operation can be carried out readily at pressures much higher than those referred to; that, regardless of the enormous magnitude of the pressures herein contemplated, (*i. e.*, from 400 to 2,000 atmospheres) there is advantage in their employment, and that the operation can be carried on without any difficulty under the conditions hereinafter described. These pressures, which, in so far as I am aware, have never before been employed in the art, are within the range of those which are generated in the firing of artillery, and are hereinafter referred to as "hyper-pressures."

I have determined the conditions which these hyper-pressures permit or require. The presence of a catalyst is still necessary, when the hyper-pressures are employed, but the increase in output of the reaction absolves the operator from being obliged to use catalysts of very high efficiency and of correspondingly high cost; ordinary catalyzers, such as iron, may be employed.

Practical demonstrations have shown that the most favorable temperature, in the employment of these hyper-pressures, is from about 500 to 700° C. according to the nature of the catalyst employed. Even with catalysts of low efficiency co-efficients of combination practically acceptable are obtained.

So also, I have ascertained that even with apparatus of a relatively low productive capacity, the reaction, when once started, will proceed without requiring a continued supply of heat from without for its maintenance. In fact, the excess heat of the reaction, which should be carried off by suitably cooling the exterior surface of the catalyzer at the zone of reaction can be readily recovered in utilizable form; for example, in the form of high pressure steam, which might, for instance, supply a part of the motive power necessary for carrying out the process.

Because of the large co-efficient of combination obtained and because of the working pressure itself, the ammonia produced can be readily liquefied by means of cold water circulation without having recourse to any special refrigerating agent. I thus avoid the engineering difficulties, noted by Haber, which arise from the necessity of constructing (without too great a loss of heat) apparatus to be operated under pressure, one part of which apparatus is heated to a high temperature, and another of which is cooled to a temperature sufficiently low (about 35° C. below zero) necessary in the practice of the Haber process to liquefy the ammonia.

Furthermore, instead of causing the reacting mixture to pass several times in succession through the same catalyzing material, with the addition of a small quantity of new mixture after each passage, as in the processes heretofore known, I find it preferable to cause the mixture to pass successively through catalyzers arranged in series. At a pressure of 1000 atmospheres, two or three of such catalyzing units will, in general, suffice, because of the high co-efficient of transformation. This procedure has the further advantage of permitting the expulsion of the gases after they have passed through the last catalyzer,—the gases then containing, beside the meager residue of uncombined nitrogen and hydrogen, the impurities present in the original mixture, such as argon, if the nitrogen has been extracted from atmospheric air. The process proceeds, therefore, in a continuous manner, whereas, in prior processes, it is necessary, from time to time, to interrupt the operation in order to expel the impurities which have accumulated in small increments during preceding phases thereof.

The important commercial result attained by the present process is that the output of ammonia produced is considerably increased; thus, when operating at 1000 atmospheres, the co-efficient of combination can attain 50 per cent., whereas the processes heretofore employed do not exceed a yield of 11 to 15%.

The accompanying diagrammatic drawing represents one of the forms of apparatus for the practice of the present process in Figure 1, Fig. 1$^a$ representing a detail of the apparatus.

Let us suppose that the mixture of nitrogen and hydrogen, in the volumetric proportion of three parts of hydrogen to one of nitrogen, is compressed by well known apparatus to 100 atmospheres, for example.

In this state, the said mixture is aspirated through the pipe $t$, after passing, if need be, through purifiers (not shown) the aspiration being effected by the special compressor of very high pressure, $C_1C_2$, called the "hyper-compressor." This apparatus is, for example, a two-stage compressor and is made up of cylinders in which work the plunger pistons $p, p'$. In the first stage, the pressure of the mixture is raised from 100 atmospheres to 350 atmospheres; in the second stage, the pressure is raised from 350 atmospheres to 1000 atmospheres.

K is the first catalyzer, into which the hyper-compressed mixture enters by way of $t_1$, B. This apparatus consists of a long very thick seamless tube, of steel or other suitable metal, of great mechanical resistance and low conductibility for heat, closed at its right-hand end, and within which another tube $T_1$ having thin walls and open at its right-hand end, is placed concentrically, being supported at said end by the perforated ring J. This second tube, which contains near its right-hand end the catalyzing material, is fixed at its left-hand end within the metal plug A which is itself screwed up hard and in a fluid-tight manner (by embedding the joints in copper, for instance as illustrated in Fig. 1$^a$ of the drawing) onto the left-hand end of the outer tube. Onto the head or plug A is screwed in like fluid-tight manner, another thick tube G constituting a condenser and surrounded for that purpose with a water-circulation jacket E.

The internal cross-sectional area of G is widened at the bottom, at F, where the condensed liquid accumulates. This liquid can be withdrawn to the outside through the cock R, while the non-combined gases are directed, through the tube H into a second catalyzer K', and, if necessary, to a third (not shown), the dimensions of which catalyzers may successively decrease.

The unit T, $T_1$, constitutes, at its left-hand part, a temperature interchanger in which the gaseous mixture arriving at B is heated up to the temperature of reaction by reason of the heat disengaged therein. At the right-hand part, this mixture serves as a medium for the removal of the heat of reaction to the outside. It will be observed that the smallness of the cross-sectional area of the central tube which is a concomitant of the vastness of the pressures, greatly facilitates the elimination, through the wall, of the heat generated, so that the exact temperature which is most favorable is obtained, since a large quantity of heat is produced in a very small space.

This carrying off of an important amount of heat across a relatively small cross-sectional area necessitates a considerable drop of temperature between the interior catalyzer chamber and the exterior wall of the inclosure sustaining the pressure. This fall of temperature is due to the fact that the inclosure is constituted, as I have pointed out above, by a metal of poor heat conductibility. The result is that the exterior layers of this inclosure, while permitting the escape outwardly of a large amount of heat, will be maintained at temperatures which are sufficiently low as not to comprise the mechanical resistance of the metal and its impermeability to the gases. Furthermore, if necessary, the obtaining of the low external temperature can be facilitated by interposing between the reaction chamber and the internal wall supporting the pressure, a body of insulating material, such as asbestos, which will increase the drop of temperature between the interior of the reaction chamber and the exterior of the inclosure supporting the pressure. In the accompanying drawing, this insulating layer would be applied to the interior wall of the tube T.

Of course, the reaction will not start of itself. It can be started, for example, by means of an electric heating resistance placed near the right-hand end of T, as shown in the drawing, the electric current being cut off as soon as the reaction is under way.

What I claim is:

1. The process of producing ammonia synthetically from its elements, in the presence of a catalyst, which comprises carrying on the reaction under a pressure within the range of 400 to 2000 atmospheres, and at a temperature within the range of 500° C. to 700° C., the heat required for starting the reaction being supplied from without and the temperature of reaction being thereafter maintained by the heat of combination itself with the removal of any excess of heat.

2. The process of producing ammonia synthetically from its elements, in the presence of a catalyst, which comprises passing a mixture of said elements under a pressure within the range of 400 to 2000 atmospheres successively through a series of catalytic bodies at a temperature within the range of 500° C. to 700° C., and collecting the ammonia formed in individual members of the series before the passage of the mixture to the remainder thereof.

3. The process of producing ammonia synthetically, from its elements, in the presence of a catalyst, which comprises passing a mixture of said elements under a pressure within the range of 400 to 2000 atmospheres successively through a series of catalytic bodies at a temperature within the range of 500° C. to 700° C., collecting the ammonia formed in individual members of the series before the passage of the mixture to the remainder thereof, and finally expelling the residual gases, containing the impurties, from the last member of the series.

4. The process of producing ammonia synthetically from its elements, in the presence of a catalyst, which comprises compressing a mixture of three parts of hydrogen and one part of nitrogen to a pressure within the range of 400 to 2000 atmospheres, then passing it in counter-current flow into heat-exchange contiguity to the hot gases of the reaction and then through the catalyst, and finally cooling the gases so as to separate the ammonia therefrom by liquefaction, the reaction being maintained at a temperature within the range of 500° C. to 700° C. by eliminating the excess of heat.

5. The process of producing ammonia synthetically from its elements, in the presence of a catalyst, which comprises compressing a mixture of three parts of hydrogen and one part of nitrogen to a pressure within the range of 400 to 2000 atmospheres, then passing it in counter-current flow into heat-exchange contiguity to the hot gases of the reaction and then through the catalyst, and finally cooling the gases by means of cold water so as to separate the ammonia therefrom by liquefaction, the reaction being maintained at a temperature within the range of 500° C. to 700° C. by eliminating the excess of heat.

6. The process of producing ammonia synthetically from its elements, in the presence of a catalyst, which comprises compressing a mixture of three parts of hydrogen and one part of nitrogen to a pressure initially of from 150 to 200 atmospheres and then to a pressure within the range of 400 to 2000 atmospheres, then passing the compressed mixture in counter-current flow into heat exchange contiguity to the hot gases of the reaction and then through the catalyst, then cooling the gases so as to separate the ammonia therefrom by liquefaction, the reaction being maintained at a temperature within the range of 500° C. to 700° C. by eliminating the excess of heat, and then causing the residual gaseous mixture to pass successively through additional catalytic and condensing units where it is submitted to the same treatment as before, and finally expelling outwardly the residual gases, containing the impurities, from the last member of the series of units.

7. The process of producing ammonia synthetically from its elements, in the presence of a catalyst, which comprises compressing a mixture of three parts of hydrogen and one part of nitrogen to a pressure initially of from 150 to 200 atmospheres and then to a pressure within the range of 400 to 2000 atmospheres, then passing the compressed mixture in counter-current flow into heat-exchange contiguity to the hot gases of the reaction and then through the catalyst, then cooling the gases by means of cold water so as to separate the ammonia therefrom by liquefaction, the reaction being maintained at a temperature within the range of 500° C. to 700° C. by eliminating the excess of heat, and then causing the residual gaseous mixture to pass successively through additional catalytic and condensing units where it is submitted to the same treatment as before, and finally expelling outwardly the residual gases, containing the impurities from the last member of the series of units.

GEORGES CLAUDE.